(12) United States Patent
Yu et al.

(10) Patent No.: US 12,094,453 B2
(45) Date of Patent: Sep. 17, 2024

(54) FAST EMIT LOW-LATENCY STREAMING ASR WITH SEQUENCE-LEVEL EMISSION REGULARIZATION UTILIZING FORWARD AND BACKWARD PROBABILITIES BETWEEN NODES OF AN ALIGNMENT LATTICE

(71) Applicant: Google LLC, Mountain View, CA (US)

(72) Inventors: Jiahui Yu, Mountain View, CA (US); Chung-cheng Chiu, Sunnyvale, CA (US); Bo Li, Fremont, CA (US); Shuo-yiin Chang, Sunnyvale, CA (US); Tara Sainath, Jersey City, NJ (US); Wei Han, Mountain View, CA (US); Anmol Gulati, Mountain View, CA (US); Yanzhang He, Mountain View, CA (US); Arun Narayanan, Santa Clara, CA (US); Yonghui Wu, Fremont, CA (US); Ruoming Pang, New York, NY (US)

(73) Assignee: Google LLC, Mountain View, CA (US)

( * ) Notice: Subject to any disclaimer, the term of this patent is extended or adjusted under 35 U.S.C. 154(b) by 381 days.

(21) Appl. No.: 17/447,285

(22) Filed: Sep. 9, 2021

(65) Prior Publication Data
US 2022/0122586 A1 Apr. 21, 2022

Related U.S. Application Data

(60) Provisional application No. 63/094,274, filed on Oct. 20, 2020.

(51) Int. Cl.
*G10L 15/06* (2013.01)
*G10L 15/16* (2006.01)
(Continued)

(52) U.S. Cl.
CPC ............ *G10L 15/063* (2013.01); *G10L 15/16* (2013.01); *G10L 15/22* (2013.01); *G10L 15/30* (2013.01); *G10L 15/187* (2013.01)

(58) Field of Classification Search
CPC .......................... G10L 15/063; G10L 15/187
(Continued)

(56) References Cited

U.S. PATENT DOCUMENTS

| 9,280,969 B2* | 3/2016 | Li .......................... G10L 15/063 |
| 11,769,493 B2* | 9/2023 | Rao ....................... G10L 15/187 |
| | | 704/202 |
| 2017/0011738 A1* | 1/2017 | Senior ................... G10L 15/063 |

(Continued)

FOREIGN PATENT DOCUMENTS

| JP | 2020-505650 A | 2/2020 |
| JP | 2023-524188 A | 6/2023 |

OTHER PUBLICATIONS

International Search Report and Written Opinion, related to Application No. PCT/US2021/049738, dated Dec. 23, 2021.
(Continued)

*Primary Examiner* — Farzad Kazeminezhad
(74) *Attorney, Agent, or Firm* — Honigman LLP; Brett A. Krueger; Grant Griffith

(57) ABSTRACT

A computer-implemented method of training a streaming speech recognition model that includes receiving, as input to the streaming speech recognition model, a sequence of acoustic frames. The streaming speech recognition model is configured to learn an alignment probability between the sequence of acoustic frames and an output sequence of vocabulary tokens. The vocabulary tokens include a plurality of label tokens and a blank token. At each output step, the method includes determining a first probability of emitting one of the label tokens and determining a second probability of emitting the blank token. The method also includes
(Continued)

generating the alignment probability at a sequence level based on the first probability and the second probability. The method also includes applying a tuning parameter to the alignment probability at the sequence level to maximize the first probability of emitting one of the label tokens.

24 Claims, 8 Drawing Sheets

(51) Int. Cl.
  *G10L 15/187* (2013.01)
  *G10L 15/22* (2006.01)
  *G10L 15/30* (2013.01)
(58) Field of Classification Search
  USPC .......................................... 704/202
  See application file for complete search history.

(56) References Cited

U.S. PATENT DOCUMENTS

2019/0057683 A1  2/2019  Sak et al.
2020/0365142 A1  11/2020  Sak et al.

OTHER PUBLICATIONS

Jiahui Yu et al, "FastEmit: Low-Latency Streaming ASR with Sequence-Level Emission Regularization", ICASSP 2021—2021 IEEE International Conference on Acoustics, Speech and Signal Processing (ICASSP), IEEE, Jun. 6, 2021 (Jun. 6, 2021), pp. 6004-6008.

Qian Zhang et al: "Transformer Transducer: A Streamable Speech Recognition Model with Transformer Encoders and RNN-T Loss", ICASSP 2020—2020 IEEE International Conference on Acoustics, Speech and Signal Processing (ICASSP), IEEE, May 4, 2020.

Japanese Office Action for the related Application No. JP2023-524188, dated Sep. 4, 2023, 2 pages.

* cited by examiner

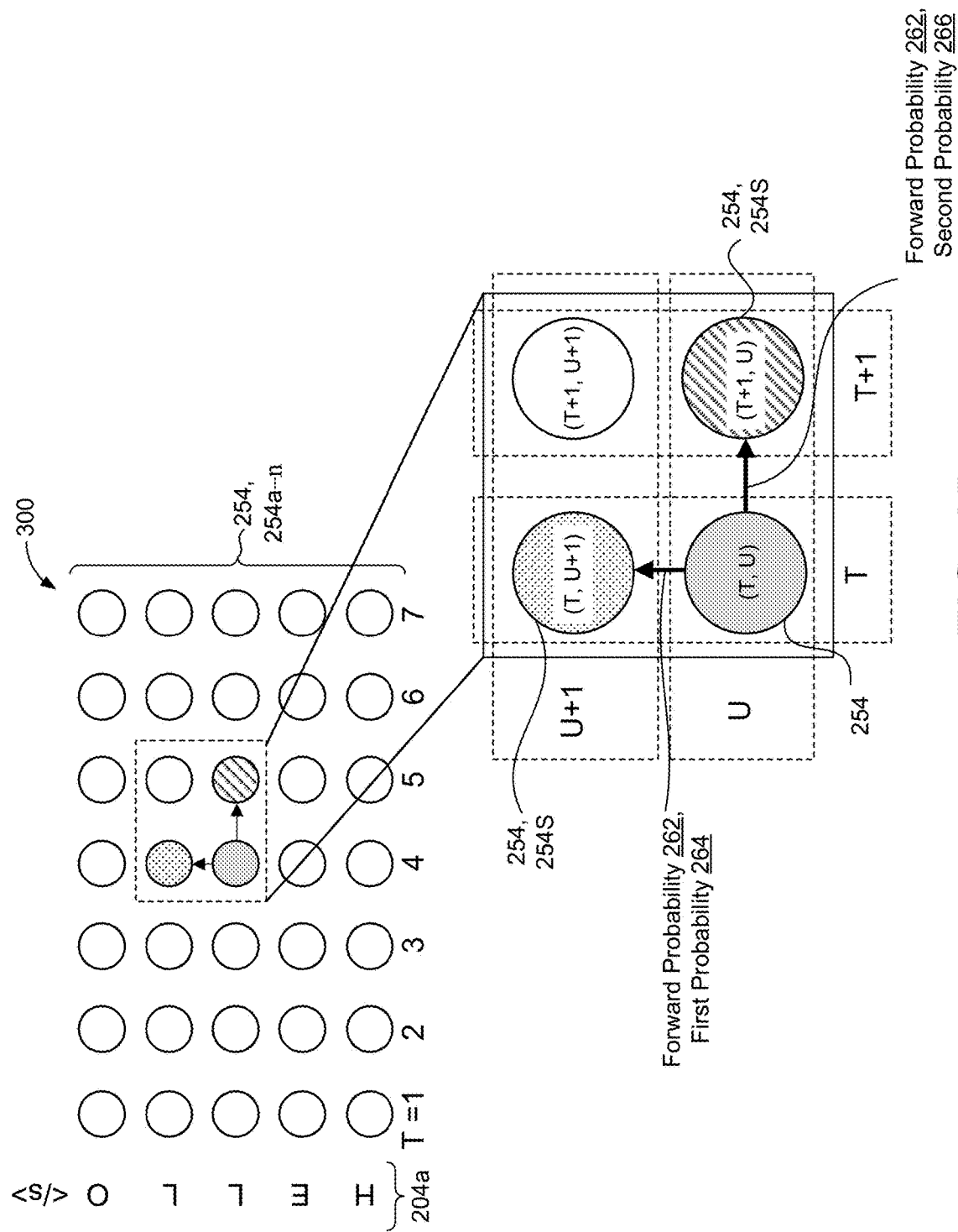

FAST EMIT LOW-LATENCY STREAMING ASR WITH SEQUENCE-LEVEL EMISSION REGULARIZATION UTILIZING FORWARD AND BACKWARD PROBABILITIES BETWEEN NODES OF AN ALIGNMENT LATTICE

CROSS REFERENCE TO RELATED APPLICATIONS

This U.S. patent application claims priority under 35 U.S.C. § 119(e) to U.S. Provisional Application 63/094,274, filed on Oct. 20, 2020. The disclosure of this prior application is considered part of the disclosure of this application and is hereby incorporated by reference in its entirety.

TECHNICAL FIELD

This disclosure relates to using fast emit low-latency streaming ASR with sequence-level emission regularization.

BACKGROUND

Automatic speech recognition (ASR) attempts to provide accurate transcriptions of what a person has said by taking an audio input and transcribing the audio input into text. Streaming ASR models aim to achieve transcribing each word in the audio input as quickly and accurately as possible. End-to-end (E2E) recurrent neural network transducer (RNN-T) models have gained enormous popularity for streaming ASR models. These streaming ASR models learn to predict best by using future context of the audio input, which causes a significant delay between the user speaking and transcription generation. Some approaches, manipulate probabilities of the transcription in order to reduce the amount of delay. However, while manipulating probabilities of the transcription provides some success in reducing latency of streaming ASR models, the success comes at the cost of suffering from severe accuracy regression.

SUMMARY

One aspect of the disclosure provides a computer-implemented method that when executed on data processing hardware causes the data processing hardware to perform operations for training a streaming speech recognition model. The operations include receiving, as input to the speech recognition model, a sequence of acoustic frames. The streaming speech recognition model is configured to learn an alignment probability between the sequence of acoustic frames and an output sequence of vocabulary tokens. The vocabulary tokens include a plurality of label tokens and a blank token. At each step of a plurality of output steps, the operations include determining a first probability of emitting one of the label tokens and determining a second probability of emitting the blank token. The operations also include generating the alignment probability at a sequence level based on the first probability of emitting one of the label tokens and the second probability of emitting the blank token at each output step. The operations also include applying a tuning parameter to the alignment probability at the sequence level to maximize the first probability of emitting one of the label tokens.

Implementations of the disclosure may include one or more of the following optional features. In some implementations, the first probability of emitting one of the label tokens at the respective step corresponds to a probability of emitting one of the label tokens after previously emitting a respective label token. The second probability of emitting the blank token at the respective step may correspond to a probability of emitting the blank label after emitting one of the blank label or a label token at a step immediately preceding the respective step. Optionally, the first probability and the second probability may define a forward variable of a forward-backward propagation algorithm.

In some examples, the operations further include generating an alignment lattice that includes a plurality of nodes, the alignment lattice is defined as a matrix with T columns of nodes and U rows of nodes. Here, each column of the T columns corresponds to a corresponding step of the plurality of output steps and each row of the U rows corresponds to a label that textually represents the sequence of acoustic frames. In these examples, at each node location in the matrix of the alignment lattice, the operations may further include: determining a forward probability for predicting a subsequent node adjacent to the respective node, the forward probability includes the first probability and the second probability; and determining, from the subsequent node adjacent to the respective node, a backward probability of including the respective node in an output sequence of vocabulary tokens. Generating the alignment probability at the sequence level may include aggregating the forward probability and the backward probability for all nodes at each respective step of the alignment lattice.

In some implementations, applying the tuning parameter to the alignment probability at the sequence level balances a loss at the streaming speech recognition model and a regularization loss when training the streaming speech recognition model. The tuning parameter may be applied independent of any speech-word alignment information. In some examples, emission of the blank token at one of the output steps is not penalized. Optionally, the streaming speech recognition model may include at least one of a recurrent neural-transducer (RNN-T) model, a Transformer-Transducer model, a Convolutional Network-Transducer (ConvNet-Transducer) model, or a Conformer-Transducer model. The streaming speech recognition model may include a recurrent neural-transducer (RNN-T) model. The streaming speech recognition model may include a Conformer-Transducer model. In some implementations, after training the streaming speech recognition model, the trained streaming speech recognition model executes on a user device to transcribe speech in a streaming fashion. In other implementations, after training the streaming speech recognition model, the trained streaming speech recognition model executes on a server.

Another aspect of the disclosure provides a system of training a streaming speech recognition model. The system includes data processing hardware and memory hardware in communication with the data processing hardware. The memory hardware stores instructions that when executed on the data processing hardware cause the data processing hardware to perform operations. The operations include receiving, as input to the speech recognition model, a sequence of acoustic frames. The streaming speech recognition model is configured to learn an alignment probability between the sequence of acoustic frames and an output sequence of vocabulary tokens. The vocabulary tokens include a plurality of label tokens and a blank token. At each step of a plurality of output steps, the operations include determining a first probability of emitting one of the label tokens and determining a second probability of emitting the blank token. The operations also include generating the alignment probability at a sequence level based on the first probability of emitting one of the label tokens and the second probability of emitting the blank token at each output step. The operations also include applying a tuning parameter to the alignment probability at the sequence level to maximize the first probability of emitting one of the label tokens.

Implementations of the disclosure may include one or more of the following optional features. In some implementations, the first probability of emitting one of the label tokens at the respective step corresponds to a probability of emitting one of the label tokens after previously emitting a respective label token. The second probability of emitting the blank token at the respective step may correspond to a probability of emitting the blank label after emitting one of the blank label or a label token at a step immediately preceding the respective step. Optionally, the first probability and the second probability may define a forward variable of a forward-backward propagation algorithm.

In some examples, the operations further include generating an alignment lattice that includes a plurality of nodes, the alignment lattice is defined as a matrix with T columns of nodes and U rows of nodes. Here, each column of the T columns corresponds to a corresponding step of the plurality of output steps and each row of the U rows corresponds to a label that textually represents the sequence of acoustic frames. In these examples, at each node location in the matrix of the alignment lattice, the operations may further include: determining a forward probability for predicting a subsequent node adjacent to the respective node, the forward probability includes the first probability and the second probability; and determining, from the subsequent node adjacent to the respective node, a backward probability of including the respective node in an output sequence of vocabulary tokens. Generating the alignment probability at the sequence level may include aggregating the forward probability and the backward probability for all nodes at each respective step of the alignment lattice.

In some implementations, applying the tuning parameter to the alignment probability at the sequence level balances a loss at the streaming speech recognition model and a regularization loss when training the streaming speech recognition model. The tuning parameter may be applied independent of any speech-word alignment information. In some examples, emission of the blank token at one of the output steps is not penalized. Optionally, the streaming speech recognition model may include at least one of a recurrent neural-transducer (RNN-T) model, a Transformer-Transducer model, a Convolutional Network-Transducer (ConvNet-Transducer) model, or a Conformer-Transducer model. The streaming speech recognition model may include a recurrent neural-transducer (RNN-T) model. The streaming speech recognition model may include a Conformer-Transducer model. In some implementations, after training the streaming speech recognition model, the trained streaming speech recognition model executes on a user device to transcribe speech in a streaming fashion. In other implementations, after training the streaming speech recognition model, the trained streaming speech recognition model executes on a server.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3B is a schematic view of determining a forward probability for the alignment lattice of FIG. 3A.

Like reference symbols in the various drawings indicate like elements.

DETAILED DESCRIPTION

Streaming automated speech recognition (ASR) aims to emit each hypothesized word as quickly and accurately as possible. However, reducing emission delay (i.e., the delay between a user speaking and text appearing) of each hypothesized word while retaining accuracy is challenging. Some approaches regularize or penalize emission delay by manipulating per-token or per-frame probability predictions in transducer models. While penalizing emission delay by manipulating per-token or per-frame probabilities successfully reduces emission delay, these approaches suffer from significant accuracy regressions. To increase accuracy of streaming speech recognition results, implementations herein are directed toward a method of training a sequence-level streaming speech recognition model. In particular, training the transducer model aims to reduce the emission latency while without suffering from accuracy regression. The emission latency represents the time period between when the user finishes speaking and when a transcription for the last word spoken by the user appears.

Figure 1:
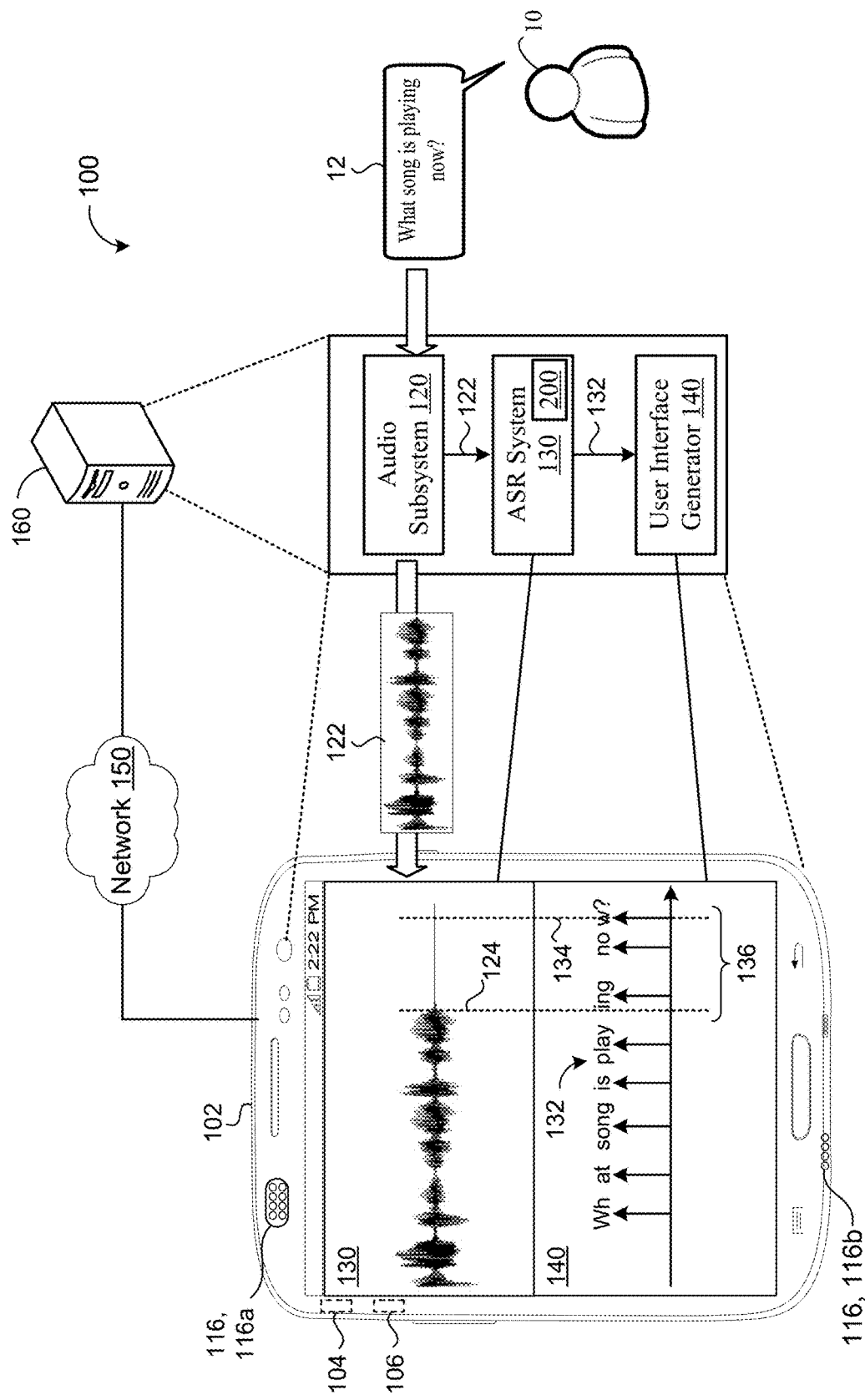
FIG. 1 is an example system for example speech recognition system.

Referring now to FIG. 1, an example speech environment 100 includes an automated speech recognition (ASR) system 130 that resides on a user device 102 of a user 10 and/or on a remote computing device 160 (e.g., one or more servers of a distributed system executing in a cloud-computing environment) in communication with the user device 102 via a network 150. Although the user device 102 is depicted as a mobile computing device (e.g., a smart phone), the user device 102 may correspond to any type of computing device such as, without limitation, a tablet device, a laptop/desktop computer, a wearable device, a digital assistant device, a smart speaker/display, a smart appliance, an automotive infotainment system, or an Internet-of-Things (IoT) device. The user device 102 includes data processing hardware 104 and memory hardware 106 in communication with the data processing hardware 104 and stores instructions, that when executed by the data processing hardware 104, cause the data processing hardware 104 to perform one or more operations.

The user device 102 further includes an audio system 116 with an audio capture device (e.g., microphone) 116, 116a for capturing and converting spoken utterances 12 within the speech environment 100 into electrical signals and a speech output device (e.g., a speaker) 116, 116b for communicating an audible audio signal (e.g., as output audio data from the user device 102). While the user device 102 implements a single audio capture device 116a in the example shown, the user device 102 may implement an array of audio capture devices 116a without departing from the scope of the present disclosure, whereby one or more capture devices 116a in the array may not physically reside on the user device 102, but be in communication with the audio system 116.

The user device 102 includes an audio subsystem 120 configured to receive an utterance 12 (e.g., captured by the one or more microphones 116a) spoken by the user 10 and converts the utterance 12 into a corresponding digital format associated with input acoustic frames 122 capable of being processed by the ASR system 130. In the example shown, the user 10 speaks a respective utterance 12 in a natural language of English for the phrase "What song is playing now?" and the audio subsystem 120 converts the utterance 12 into a corresponding sequence of acoustic frames 122 for input to the ASR system 130. Thereafter, the ASR system 130 receives, as input, the acoustic frames 122 corresponding to the utterance 12, and generates/predicts, as output, a corresponding transcription (e.g., recognition result/hypothesis) 132 of the utterance 12. The time period between when the user 10 stops talking 124 (e.g., end of speech (EOS) 124) and when the last token of the transcription (e.g. end of transcription 134) is transcribed represents the emission latency 136.

In the example shown, the user device 102 and/or the remote computing device 160 also executes a user interface generator 140 configured to present a representation of the transcription 132 of the utterance 12 to the user 10 of the user device 102. In some configurations, the transcription 132 output from the ASR system 130 is processed, e.g., by a natural language understanding (NLU) module executing on the user device 102 or the remote computing device 160, to execute a user command. Additionally or alternatively, a text-to-speech system (e.g., executing on any combination of the user device 102 or the remote computing device 160) may convert the transcription 132 into synthesized speech for audible output by another device. For instance, the original utterance 12 may correspond to a message the user 10 is sending to a friend in which the transcription 132 is converted to synthesized speech for audible output to the friend to listen to the message conveyed in the original utterance 12. As shown in FIG. 1A, an example speech environment 100, 100a generates the transcription 132 with the ASR system 130.

The ASR system 130 includes a streaming ASR model 200 that is configured to reduce the emission latency 136 between the EOS 124 and the end of transcription 134. A training process 201 (FIG. 2B) trains the ASR model 200 to encourage the ASR model 200 to emit characters of the transcription 132 rather than emitting blanks without penalizing the emission of blanks. In some examples, the ASR model 200 maximizes the probability of emitting a character transcriptions at a sequence level rather than at a per-frame or per-token level.

Figure 2A:
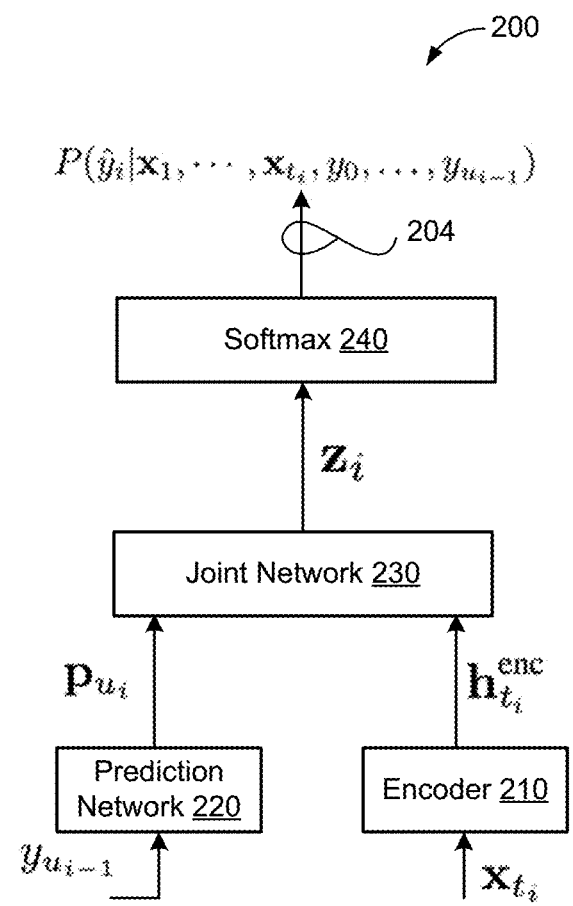
FIG. 2A is a schematic view of a Recurrent Neural Network-Transducer (RNN-T) speech recognition model.

FIG. 2A illustrates an example ASR model 200 that includes a Recurrent Neural Network-Transducer (RNN-T) model architecture which adheres to latency constrains associated with interactive applications. The RNN-T model 200 provides a small computational footprint and utilizes less memory requirements than conventional ASR architectures, making the RNN-T model architecture suitable for performing speech recognition entirely on the user device 102 (e.g., no communication with a remote server is required). While FIG. 2A depicts the ASR model 200 including the RNN-T model architecture, the ASR model 200 may also include other types of transducer models such as a Transformer-Transducer model architecture, a Convolutional Neural Network-Transducer (CNN-Transducer) model architecture, a Convolutional Network-Transducer (ConvNet-Transducer) model, or a Conformer-Transducer model architecture without departing from the scope of the present disclosure. An example Transformer-Transducer model architecture is described in detail in "Transformer Transducer: A Streamable Speech Recognition Model with Transformer Encoders and RNN-T Loss," https://arxiv.org/pdf/2002.02562.pdf, the contents of which are incorporated by reference in their entirety. An example CNN-Transducer model architecture is described in detail in "Contextnet: Improving Convolutional Neural Networks for Automatic Speech Recognition with Global Context," https://arxiv.org/abs/2005.03191, the contents of which are incorporated by reference in their entirety. An example Conformer-Transducer model architecture is described in detail in "Conformer: Convolution-augmented transformer for speech recognition," https://arxiv.org/abs/2005.08100, the contents of which are incorporated by reference in their entirety.

The RNN-T model 200 of FIG. 2A includes an encoder network 210, a prediction network 220, and a joint network 230. The encoder network 210, which is roughly analogous to an acoustic model (AM) in a traditional ASR system, includes a recurrent network of stacked Long Short-Term Memory (LSTM) layers. For instance the encoder reads a sequence of d-dimensional feature vectors (e.g., acoustic frames 122 (FIG. 1)) $x=(x_1, x_2, \ldots, x_T)$, where $x_t \in \mathbb{R}_d$, and produces at each time step a higher-order feature representation. This higher-order feature representation is denoted as $h_1^{enc}, \ldots, h_T^{enc}$.

Similarly, the prediction network 220 is also an LSTM network, which, like a language model (LM), processes the sequence of non-blank tokens output by a final Softmax layer 240 so far, $y_0, \ldots, y_{ui-1}$, into a dense representation $p_{u_i}$. Finally, with the RNN-T model architecture, the representations produced by the encoder and prediction networks 210, 220 are combined by the joint network 230. The joint network then predicts $P(y_i|x_1, \ldots, x_{t_i}, y_0, \ldots, y_{u_{i-1}})$, which is a distribution over the next output token. Stated differently, the joint network 230 generates, at each output step (e.g., time step), a probability distribution over possible speech recognition hypotheses. Here, the "possible speech recognition hypotheses" correspond to a set of label tokens 204 each representing a symbol/character in a specified natural language. For example, when the natural language is English, the set of label tokens may include twenty-seven (27) symbols, e.g., one label token for each of the 26-letters in the English alphabet and one label designating a space. Accordingly, the joint network 230 may output a set of values indicative of the likelihood of occurrence of each of a predetermined set of label token. This set of values can be a vector and can indicate a probability distribution over the set of label tokens. In some cases, the label tokens are graphemes (e.g., individual characters, and potentially punctuation and other symbols), but the set of label tokens is not so limited. For example, the set of label tokens can include wordpieces and/or entire words, in addition to or instead of graphemes. The output distribution of the joint network 230 can include a posterior probability value for each of the different label tokens. Thus, if there are 100 different label tokens representing different graphemes or other symbols, the output $y_i$ of the joint network 230 can include 100 different probability values, one for each label token. The probability distribution can then be used to select and assign scores to candidate orthographic elements (e.g., graphemes, wordpieces, and/or words) in a beam search process (e.g., by the Softmax layer 240) for determining the transcription 132.

The Softmax layer 240 may employ any technique to select the label token with the highest probability in the distribution as the next output symbol predicted by the transducer model 200 at the corresponding output step. In this manner, the RNN-T model 200 does not make a conditional independence assumption, rather the prediction of each label token is conditioned not only on the acoustics but also on the sequence of label tokens emitted so far. The RNN-T model 200 does assume a label token is independent of future acoustic frames 110, which allows the RNN-T model to be employed in a streaming fashion.

In some examples, the encoder network 210 of the RNN-T model 200 is made up of eight 2,048-dimensional LSTM layers, each followed by a 540-dimensional projection layer. The prediction network 220 may have two 2,048-dimensional LSTM layers, each of which is also followed by 540-dimensional projection layer. Finally, the joint network 230 may also have 540 hidden units. The softmax layer 240 may be composed of a unified word piece or grapheme set that is generated using all unique word pieces or graphemes in a plurality of training data sets.

Figure 2B:
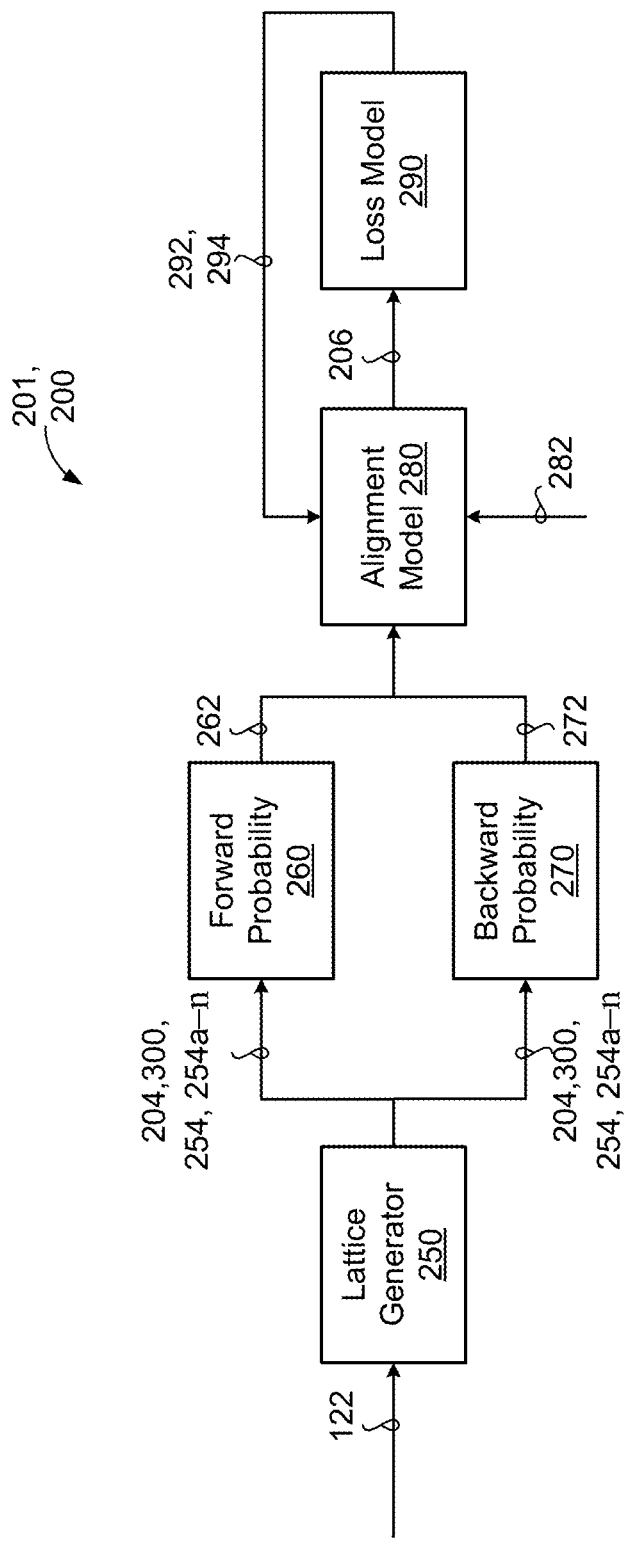
FIG. 2B is a schematic view of training a language model for a speech recognition system.
Figure 3A:
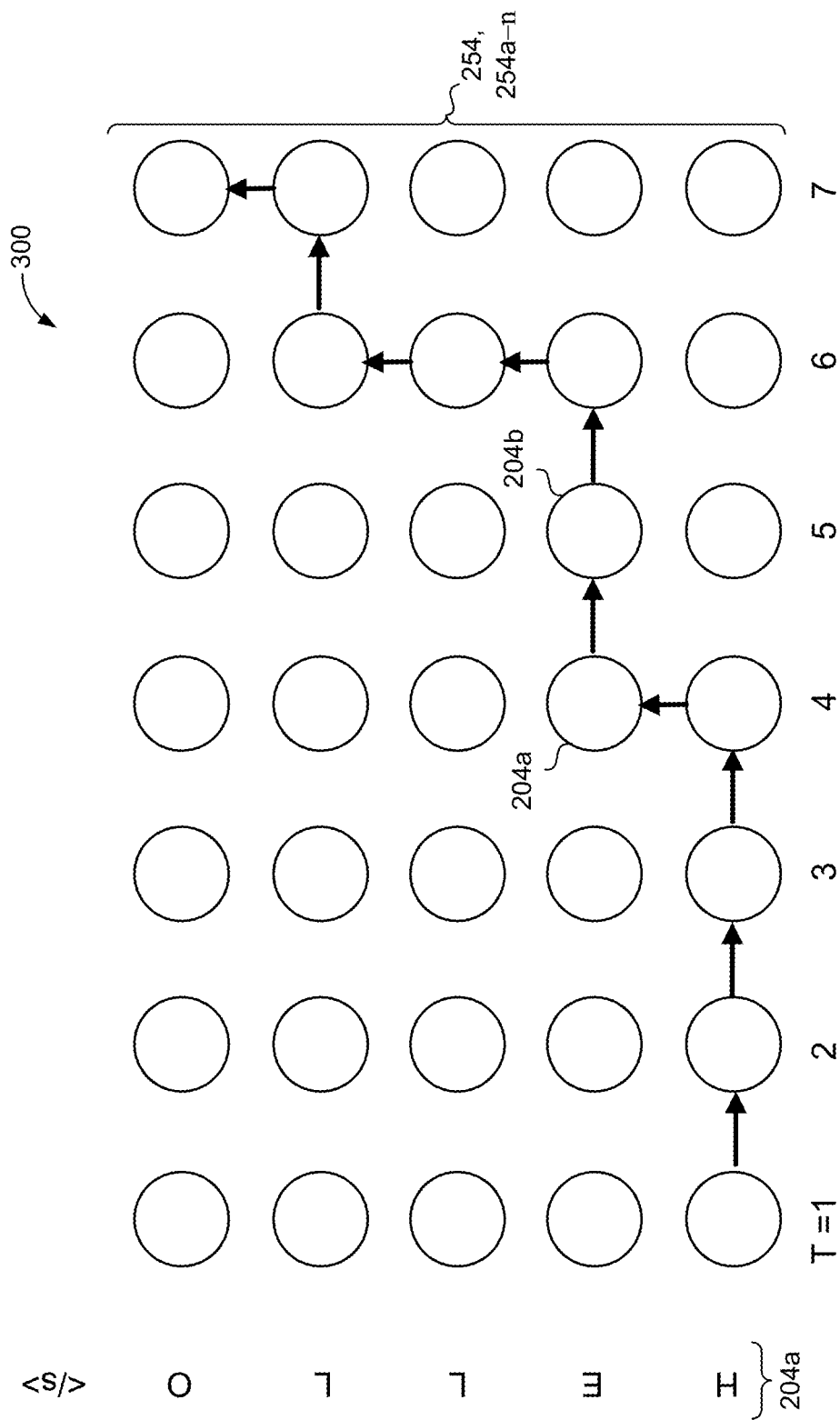
FIG. 3A is a schematic view of an example alignment lattice.

FIG. 2B illustrates a training process 201 for training the ASR model 200. Training the transducer-based streaming ASR model 200 aims to minimize the emission latency 136 without suffering from accuracy regression. The transducer-based streaming ASR model 200 may interchangeably referred to as a 'transducer model 200'. The transducer model 200 receives a sequence of acoustic frames 122 from the audio subsystem 120 and is configured to learn an alignment probability 206 between the sequence of acoustic frames 122 (e.g., x=($x_1, x_2, \ldots, x_T$) and an output sequence of vocabulary tokens 204 (e.g., y=($y_1, y_2, \ldots, y_U$). The vocabulary tokens 204 are output elements of the transducer model 200 that include a plurality of label tokens 204, 204a (FIG. 3A) and a blank token 204, 204b (FIG. 3A). The label tokens 204a are textual representations of the utterance 12 that may include graphemes (e.g., individual characters, and potentially punctuation and other symbols), wordpieces, and/or entire words. The blank token 204b is a textual representation of the utterance 12 for a blank/empty output. Accordingly, the output sequence of vocabulary tokens includes a sequence of both the label tokens 204a and the blank token 204b to represent a transcription of the utterance 12. In some examples, the vocabulary tokens 204 represent a character vocabulary with each label token 204a representing an alphabetic character (i.e., A-Z) and the blank token 204b representing a blank space. In other examples, the vocabulary tokens 204 represent a wordpiece vocabulary with each label token 204a representing one or more alphabetic characters and the blank token 204b representing a blank space. The vocabulary tokens 204 may also represent punctuation and other symbols. The vocabulary tokens 204 may include any combination of character vocabulary, wordpiece vocabulary, and/or punctuation and other symbols.

The alignment probability 206 refers to the likelihood of the transducer model 200 emitting a respective output sequence of vocabulary tokens 204 from all possible output sequences of vocabulary tokens 204. To learn the alignment probability 206 the transducer model 200 extends the output sequence with blank tokens 204b. Training the transducer model 200 aims to maximize the log-probability of a conditional distribution represented by:

$$\mathcal{L} = -\log P(\hat{y}|x) = -\log \sum_{a \in \mathcal{B}^{-1}(\hat{y})} P(a|x) \quad (1)$$

In Equation (1), $\mathcal{L}$ represents the transducer loss, a represents an alignment lattice, ŷ represents the ground truth output sequence of label tokens 204a, x represents the sequence of acoustic frames 122, and B represents a function that removes the blank tokens 204b from the alignment lattice a. In some implementations, the training process 201 applies a lattice generator 250, a forward probability layer 260, a backward probability layer 270, an alignment model 280, and a loss model 290. The lattice generator 250 is configured to generate an alignment lattice 300 for the sequence of acoustic frames 122 input to the ASR model 200. The lattice generator 250 may be composed of the encoder 210, the prediction network 220, and the joint network 230 of the transducer model 200. The alignment lattice 300 includes a matrix of vocabulary tokens 204 (e.g., label tokens 204a and blank tokens 204b) that correspond the sequence of acoustic frames 122 for the utterance 12. At each output step, the transducer model 200 emits one of the label tokens 204a or the blank token 204b from the alignment lattice 300.

Figure 3C:
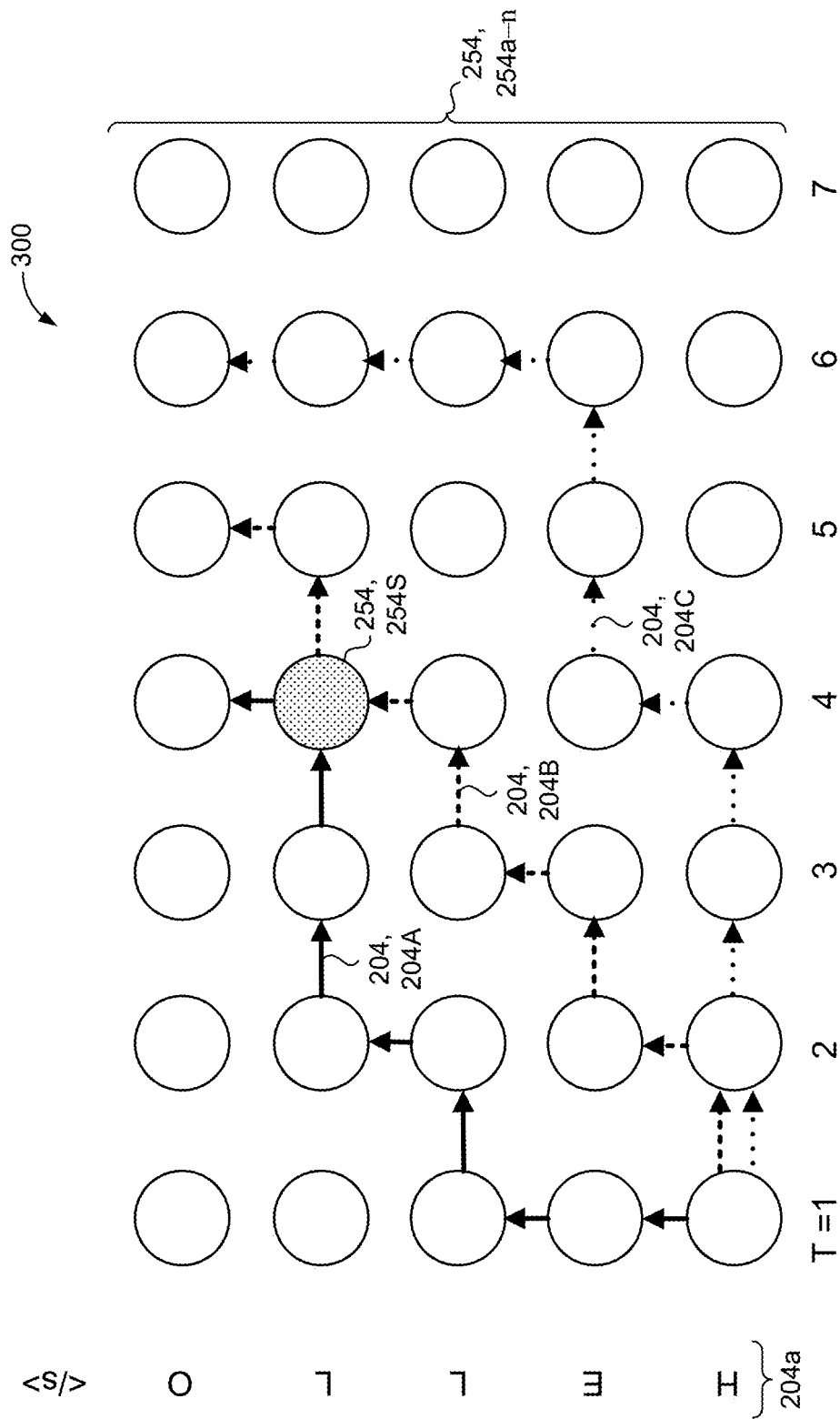
FIG. 3C is a schematic view of determining a backward probability for the alignment lattice of FIG. 3A.

Referring now to FIGS. 3A-3C the alignment lattice 300 includes a matrix having a plurality of nodes 254, 254a-n. Each node 254 in the plurality of nodes 254 represents one of the vocabulary tokens 204. That is, the alignment lattice 300 includes U rows of nodes 254, each row corresponding to a label token 204a that textually represents a portion of the sequence of acoustic frames 122. Additionally, the alignment lattice 300 includes T columns of nodes 254, each column corresponding to an output step from the plurality output steps. The transducer model 200 emits one of the label tokens 204a or the blank token 204b at each output step. The number of T columns of nodes 254 depends on the amount of output steps required to emit all of the label tokens 204a for the corresponding sequence of acoustic frames 122. The lattice generator 250 generates the alignment lattice 300 based on the sequence of acoustic frames 122 for the utterance 12. Referring now to FIGS. 2B and 3A, the alignment lattice 300 includes five (5) rows of nodes 254 and seven (7) columns of nodes 254 for the utterance 12 "HELLO." The label token 204a of each row of the alignment lattice 300 represents an alphabetic character of the word "HELLO." Here, the alignment lattice 300 includes seven columns because the transducer model 200 requires seven (7) output steps to emit the utterance 12 "HELLO." The alignment lattice 300 may include any number of T columns and U rows required to represent the corresponding sequence of acoustic frames 122.

The alignment lattice 300 provides the transducer model 200 with a matrix of vocabulary tokens 204 to generate the output sequence of vocabulary tokens 204. That is, the transducer model 200 determines, at each node 254 in the alignment lattice 300, whether to emit one of the label tokens 204a or the blank token 204b. Accordingly, at each output step the transducer model 200 either emits one of the label tokens 204a (e.g., up arrow) or emits the blank token 204b (e.g., right arrow). The transducer model 200 continues outputting vocabulary tokens 204 until the last label token 204a emits. Once the transducer model 200 emits the last label token 204a the output sequence of vocabulary tokens 204 is complete. The lattice generator 250 sends the alignment lattice 300 and the plurality of nodes 254 to the forward probability layer 260 and the backward probability layer 270.

The forward probability layer 260 and backward probability layer 270 are configured to determine a likelihood of emitting one of the label tokens 204a or the blank token 204b. The forward probability layer 260 determines the likelihood of emitting vocabulary tokens 204 based on a per-token and/or per-frame probability. That is, the forward probability layer 260 determines the likelihood of emitting vocabulary tokens 204 based on only on the vocabulary token 204 or frame. The backward probability layer 270 determines the likelihood of emitting vocabulary tokens 204 based on a per-sequence probability. Accordingly, the backward probability layer 270 takes into account the previously emitted vocabulary tokens 204 when determining which vocabulary token 204 to emit next. Taken together, the forward probability layer 260 and the backward probability layer 270 determine which vocabulary token 204 to emit based on a per-token/per-frame and per-sequence probability.

In particular, the forward probability layer 260 determines a likelihood of emitting one of the label tokens 204a or the blank token 204b at the at a subsequent node 254, 254S of the alignment lattice 300. That is, the forward probability layer 260 determines, from a respective node 254 of the alignment lattice 300, the likelihood of emitting one of the label tokens 204a or the blank token 204b at the subsequent node 254S. Here, the subsequent node 254S is adjacent to the respective node 254. The subsequent node 254S may be to the right of the respective node 254 (e.g., node (T+1, U)) that indicates emitting the blank token 204b or above the respective node 254 (e.g., node (T, U+1) that indicates emitting one of the label tokens 204a.

The forward probability layer 260 determines the likelihood of emitting vocabulary tokens 204 based on a forward probability 262. The forward probability 262 is represented by:

$$\alpha(t,u)=\hat{y}(t,u-1)\alpha(t,u-1)+b(t-1,u)\alpha(t-1,u) \quad (2)$$

In Equation 2, α(t, u) represents the forward probability 262, ŷ(t, u) represents the label token 204a, b (t, u) represents the blank token 204b, t represents the column of the respective node 254, and u represents the row of the respective node 254.

For example, referring now to FIG. 3B, the forward probability layer 260 determines from a respective node 254 (e.g., node (T, U)), a forward probability 262 that includes a first probability 264 of emitting one of the label tokens 204a and a second probability 266 of emitting the blank token 204b. Here, the first probability 264 represents the likelihood of progressing from the respective node 254 to a subsequent node 254S (e.g., node (T, U+1) to emit one of the label tokens 204a. In particular, the first probability 264 represents the likelihood of emitting the label token 204a 'L' at the next output step. Continuing with the example, the second probability 266 represents the likelihood of progressing from the respective node 254 to a subsequent node 254S (e.g., node (T+1, U)) to emit the blank token 204b. That is, the second probability 266 represents the likelihood of emitting a blank at the next output step. In some examples, the second probability 266 of emitting the blank token 204b at the respective step corresponds to a probability of emitting the blank token 204b after emitting one of the blank token 204b or a label token at a step immediately preceding the respective step.

The backward probability layer 270 is configured to determine a likelihood of the output sequence including the respective subsequent node 254S. The backward probability layer 270 determines the likelihood of the output sequence including the respective subsequent node 254S based on a backward probability 272. The backward probability layer 270 determines the backward probability 272 based on all possible output sequences 202 and the proportion of all possible output sequences 202 that include the respective subsequent node 254S represented by:

$$\beta(t,u)=\hat{y}(t,u)\beta(t,u+1)+b(t,u)\beta(t+1,u) \quad (3)$$

β(t, u) represents the backward probability, ŷ(t, u) represents the label token 204a, b(t, u) the blank token 204b, t represents the column of the respective node 254, and u represents the row of the respective node 254. Referring now to FIG. 3C, from a subsequent node 244S, the backward probability layer 270 determines the backward probability 272 of including the respective subsequent node 254S in the output sequence 202. In the example shown, the backward probability layer 270 determines three output sequences 202, however, it is understood that the backward probability layer 270 may determine any number of output sequences 202. In this example, a first output sequence 202, 202a and a second output sequence 202, 202b include the respective subsequent node 254S while a third output sequence 202, 202c does not include the respective subsequent node 254S. The backward probability layer 270 determines the backward probability 272 based on the number of output sequences 202 that include the subsequent node 254S from all possible output sequences 202. In this example, the backward probability 272 of the output sequence 202 including the respective subsequent node 254S is one-in-three.

In some implementations, the backward probability layer 270 determines the backward probability 272 for multiple subsequent nodes 254S. That is, from a respective node 254 there are two possible subsequent nodes 254S, either a subsequent node 254S that represents the label token 204a or a subsequent node 254S that represents the blank token 204b. In some examples, the backward probability layer 270 determines the backward probability 272 for both subsequent nodes 254S. In other examples, the backward probability layer 270 determines a backward probability 272 only for subsequent nodes 254S that satisfy a threshold. That is, the backward probability layer 270 only determines a backward probability 272 for a subsequent node 254S that represents the label token 204a when the first probability 264 satisfies a threshold, and for a subsequent node 254S that represents the blank token 204b when the second probability 266 satisfies a threshold.

In some implementations, a node 254 of the alignment lattice 300 may represent both one of the label tokens 204a and the blank token 204b. Depending on how the output sequence 202 traverses through the node 254 will determine if the node 254 is one of the label tokens 204a or the blank token 204b. As shown in FIG. 3C, two output sequences of vocabulary tokens 204A, 204B include the subsequent node 254C. The first output sequence of vocabulary tokens 204A progresses to the subsequent node 254S by emitting the blank token 204b (e.g., right arrow). In this instance, the subsequent node 254S represents the blank token 204b. The second output sequence of vocabulary tokens 204B progresses to the subsequent node 254S by emitting one of the label tokens 204a (e.g., up arrow). Here, the subsequent node 254S represents the one of the label tokens 204a. Thus, whether a node 254 in the alignment lattice 300 represents the one of the label tokens 204a or the blank token 204b depends on the output sequence of vocabulary tokens 204. The forward probability layer 260 and the backward probability layer 270 send the forward probability 262 and the backward probability 272, respectively, to the alignment model 280. The transducer model 200 may emit one or more vocabulary tokens 204 at an output step. For example, at output step T=6 for a third output sequence of vocabulary tokens 202C, the transducer model 200 progresses through three (3) label tokens 204a corresponding to the letters "L", "L", and "O". Here, the transducer model 200 at output step T=6, the transducer model 200 emits all three (3) of the label tokens 204a.

Referring back to FIG. 2B, the forward probability layer 260 and backward probability layer 270 send the forward probability 262 and backward probability 272 to the alignment model 280. The alignment model 280 is configured to determine the alignment probability 206 based on the forward probability 262 and backward probability 272. That is, the alignment model 280 generates the alignment probability 206 at the sequence level by aggregating the forward probability 262 and the backward probability 272 for all nodes at each respective output step of the alignment lattice 300. The alignment model 280 determines the alignment probability 206 based on the following equations:

$$P(A_{t,u} | x) = \sum_{a \in A_{t,u}} P(a | x) = \qquad (4)$$

$$\alpha(t, u)\beta(t, u) = \alpha(t, u)b(t, u)\beta(t+1, u) + \alpha(t, u)\hat{y}(t, u)\beta(t, u+1)$$

$$P(\hat{y} | x) = \sum_{(t,u):t+u=n} P(A_{t,u} | x), \forall n : 1 \le n \le U + T \qquad (5)$$

In Equations 4 and 5, $A_{t,u}$ represents the coordinates of the respective node 254 in the alignment lattice 300. Accordingly, $P(A_{t,u}|x)$ represents the probability of all complete output sequences of vocabulary tokens 204 up through a respective node 254 and $P(\hat{y}|x)$ represents the probability of all output sequences of vocabulary tokens 204 in the alignment lattice 300. In Equation 4, $\alpha(t, u)b(t, u)\beta(t+1, u)$ represents the probability of predicting the blank token 204b and $\alpha(t, u)\hat{y}(t, u)\beta(t, u+1)$ represents the probability of predicting the one of the label tokens 204a. Thus, the alignment model 280 may determine the alignment probability 206 based on a per-token probability (e.g., forward probability 262) and a per-sequence probability (e.g., backward probability 272). In some examples, the alignment model 280 sends the alignment probability 206 to the ASR system 130 to determine whether to emit the one of the label tokens 204a or the blank token 204b to generate the transcription 132 that corresponds to the utterance 19.

In some implementations, the training process 201 applies a loss model 290 configured to determine a transducer loss 292 for any node 254 of the alignment lattice 300. The alignment model 280 may send the alignment probability 206 to the loss model 290 to determine the transducer loss 292 at each output step. The loss functions may be represented by:

$$\frac{\partial \mathcal{L}}{\partial \hat{y}(t, u)} \propto \alpha(t, u)\beta(t, u+1) \qquad (6)$$

$$\frac{\partial \mathcal{L}}{\partial \hat{y}(t, u)} \propto \alpha(t, u)\beta(t+1, u) \qquad (7)$$

The transducer model 200 maximizes the log-probability of all possible output sequences of vocabulary tokens 204 regardless of the emission latency. That is, the transducer model 200 treats emitting one of the label tokens 204a and emitting the blank token the equally because the log-probability (e.g., Equation 1) is maximized. Accordingly, treating the emission of label tokens 204a and blank tokens 204b equally inevitably leads to emission latency 136 because transducer models 200 learn to predict better by using more future context, causing significant emission latency 136. That is, the loss model 290 provides the transducer loss 292 as feedback to the alignment model 280. The alignment model 280 uses the transducer loss 292 to minimize errors in vocabulary token 204 emissions. Thus, because emitting label tokens 204a and blank tokens 204b are treated equal, the alignment model 280 inevitably introduces emission latency 136. Implementations herein are directed toward training the transducer model 200 to encourage predicting one of the label tokens 204a over the blank token 204b by maximizing the probability of the label token 204a represented by:

$$\tilde{P}(A_{t,u} | x) = \alpha(t, u)\hat{y}(t, u)\beta(t, u+1) \qquad (8)$$

$$\tilde{\mathcal{L}} = -\log\tilde{P}(\hat{y} | x) = -\log \sum_{(t,u):t+u=n} \left(P(A_{t,u} | x) + \lambda\tilde{P}(A_{t,u} | x)\right) \qquad (9)$$

In Equations 8 and 9, $\tilde{P}(A_{t,u}|x)$ represents the maximized probability of emitting one of the label tokens 204a, $\tilde{\mathcal{L}}$ represents the updated transducer loss, and A represents a tuning parameter. Thus, the first probability 264 and the second probability 266 define a forward variable of a forward-backward propagation algorithm. In particular, the alignment model 280 uses first probability 264 and second probability 266 determine the alignment probability 206 of emitting the output sequence of vocabulary tokens 204 and the loss model 190 uses the first probability 264 and second probability 266 to determine the transducer loss 292 to train the alignment model 280. The alignment model 280 may be incorporated into the joint network 230 and/or Softmax layer 240 of the transducer model 200 of FIG. 2A.

The loss function for the updated transducer loss (e.g., Equation 8) applies a tuning parameter 282 to maximize the probability of emitting one of the label tokens 204a at the sequence level. The tuning parameter 282 is configured to balance the transducer loss 292 and a regularization loss 294. That is, the tuning parameter 282 balances the accuracy of vocabulary token 204 emission (e.g., transducer loss 292) and penalizing emission latency 136 (e.g., regularization loss 294). Accordingly, the transducer model 200 maximizes the probability of emitting one of the label tokens 204a without penalizing the probability of emitting one of the blank tokens 204b. The tuning parameter 282 may be applied to the alignment model 280 independent of any speech-word alignment information. In some implementations, the tuning parameter 282 can be implemented based on an existing transducer model 200 because the new regularized transducer loss can be represented by:

$$\frac{\partial \tilde{\mathcal{L}}}{\partial \hat{y}(t, u)} = (1+\lambda)\frac{\partial \mathcal{L}}{\partial \hat{y}(t, u)} \qquad (10)$$

-continued $$\frac{\partial \tilde{\mathcal{L}}}{\partial b(t, u)} = \frac{\partial \mathcal{L}}{\partial b(t, u)} \quad (11)$$

In some examples, after training the transducer model 200 using the tuning parameter 282, the trained transducer model 200 is configured to execute on the remote computing device 160 during inference. In other examples, the trained transducer model 200 execute on the user device 102 during inference. Executing the trained transducer model 200 reduces the emission latency 136 of generating the transcription 132 of the utterance 12 by maximizing the probability of emitting one of the label tokens 204a at a sequence level without penalizing the probability of emitting the blank token 204b.

Figure 4:
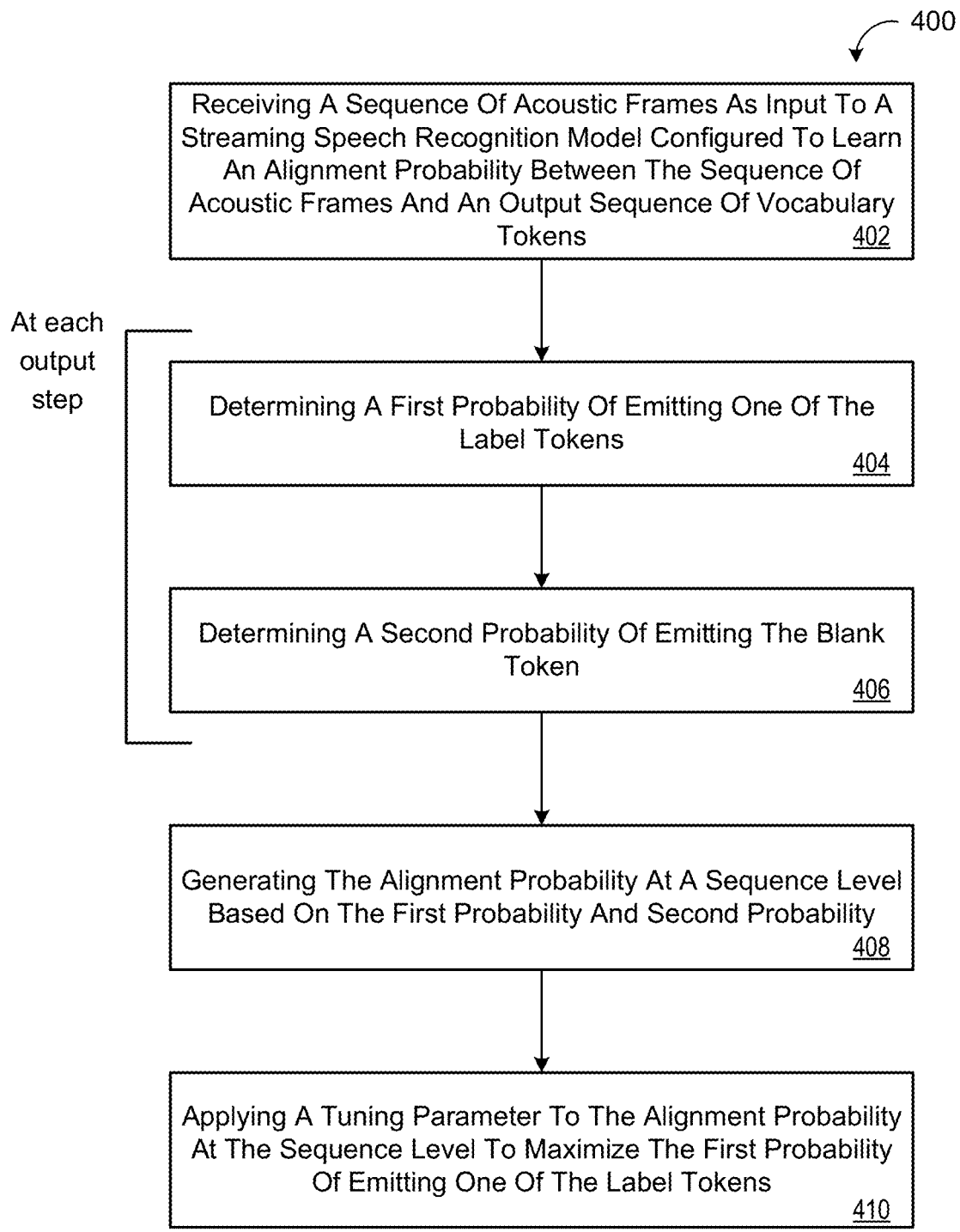
FIG. 4 is a flowchart of an example arrangement of operations for a method of training a streaming speech recognition model.

FIG. 4 is a flowchart of an exemplary arrangement of operations for a method 400 of training a streaming speech recognition model. The method 400, at step 402, includes receiving, as input to the speech recognition model, a sequence of acoustic frames 122. The streaming speech recognition model is configured to learn an alignment probability 206 between the sequence of acoustic frames 122 and an output sequence of vocabulary tokens 204. The vocabulary tokens 204 include a plurality of label tokens 204a and a blank token 204b. At each step of a plurality of output steps, the method 400, at step 404, includes determining a first probability 264 of emitting one of the label tokens 204a. At step 406, the method 400, includes determining a second probability 266 of emitting the blank token 204b.

The method 400, at step 408, includes generating the alignment probability 206 at a sequence level based on the first probability 264 of emitting one of the label tokens 204a and the second probability 266 of emitting the blank token 204b at each output step. The method 400, at step 410, include applying a tuning parameter 282 to the alignment probability 206 at the sequence level to maximize the first probability 264 of emitting one of the label tokens 204a.

Figure 5:
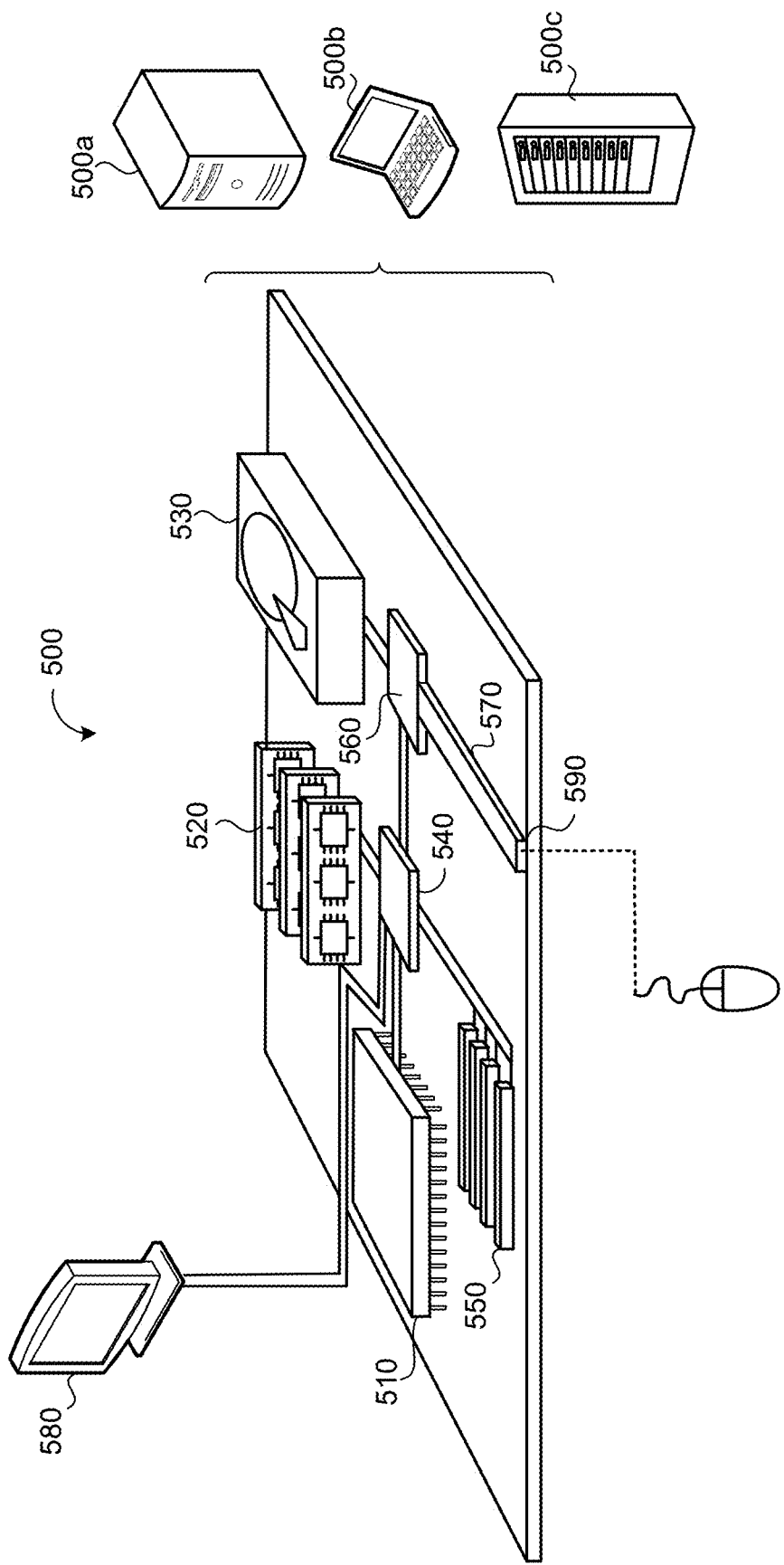
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, a memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations for training a streaming speech recognition model, the operations comprising:
   receiving, as input to the streaming speech recognition model, a sequence of acoustic frames, the streaming speech recognition model configured to learn an alignment probability between the sequence of acoustic frames and an output sequence of vocabulary tokens, the vocabulary tokens comprising a plurality of label tokens and a blank token;
   generating an alignment lattice comprising a plurality of nodes, the alignment lattice defined as a matrix with T columns of nodes and U rows of nodes, each column of the T columns corresponding to a corresponding step of the plurality of output steps, each row of the U rows corresponding to a label that textually represents the sequence of acoustic frames;
   at each node location in the matrix of the alignment lattice:
      determining a forward probability for predicting a subsequent node adjacent to the respective node; and
      determining, from the subsequent node adjacent to the respective node, a backward probability of including the respective subsequent node in an output sequence of vocabulary tokens;
   at each step of a plurality of output steps:
      determining a first probability of emitting one of the label tokens; and
      determining a second probability of emitting the blank token, wherein the forward probability comprises the first probability and the second probability;
   generating the alignment probability at a sequence level based on the first probability of emitting one of the label tokens and the second probability of emitting the blank token at each output step; and
   applying a tuning parameter to the alignment probability at the sequence level to maximize the first probability of emitting one of the label tokens, the tuning parameter applied to the alignment probability independent of any speech-word alignment information.

2. The computer-implemented method of claim 1, wherein the first probability of emitting one of the label tokens at a respective step corresponds to a probability of emitting one of the label tokens after previously emitting a respective label token.

3. The computer-implemented method of claim 1, wherein the second probability of emitting the blank token at a respective step corresponds to a probability of emitting the blank token after emitting one of the blank token or a label token at a step immediately preceding the respective step.

4. The computer-implemented method of claim 1, wherein the first probability and the second probability define a forward variable of a forward-backward propagation algorithm.

5. The computer-implemented method of claim 1, wherein generating the alignment probability at the sequence level comprises aggregating the forward probability and the backward probability for all nodes at each respective step of the alignment lattice.

6. The computer-implemented method of claim 1, wherein applying the tuning parameter to the alignment probability at the sequence level balances a loss at the streaming speech recognition model and a regularization loss when training the streaming speech recognition model.

7. The computer-implemented method of claim 1, wherein emission of the blank token at one of the output steps is not penalized.

8. The computer-implemented method of claim 1, wherein the streaming speech recognition model comprises at least one of:
a recurrent neural-transducer (RNN-T) model;
a Transformer-Transducer model;
a Convolutional Network-Transducer (ConvNet-Transducer) model; or
a Conformer-Transducer model.

9. The computer-implemented method of claim 1, wherein the streaming speech recognition model comprises a recurrent neural-transducer (RNN-T) model.

10. The computer-implemented method of claim 1, wherein the streaming speech recognition model comprises a Conformer-Transducer model.

11. The computer-implemented method of claim 1, wherein after training the streaming speech recognition model, the trained streaming speech recognition model executes on a user device to transcribe speech in a streaming fashion.

12. The computer-implemented method of claim 1, wherein, after training the streaming speech recognition model, the trained streaming speech recognition model executes on a server.

13. A system of training a streaming speech recognition model, the system comprising:
data processing hardware; and
memory hardware in communication with the data processing hardware, the memory hardware storing instructions that when executed by the data processing hardware cause the data processing hardware to perform operations comprising:
receiving, as input to the speech recognition model, a sequence of acoustic frames, the streaming speech recognition model configured to learn an alignment probability between the sequence of acoustic frames and an output sequence of vocabulary tokens, the vocabulary tokens comprising a plurality of label tokens and a blank token;
generating an alignment lattice comprising a plurality of nodes, the alignment lattice defined as a matrix with T columns of nodes and U rows of nodes, each column of the T columns corresponding to a corresponding step of the plurality of output steps, each row of the U rows corresponding to a label that textually represents the sequence of acoustic frames;
at each node location in the matrix of the alignment lattice:
determining a forward probability for predicting a subsequent node adjacent to the respective node; and
determining, from the subsequent node adjacent to the respective node, a backward probability of including the respective subsequent node in an output sequence of vocabulary tokens;
at each step of a plurality of output steps:
determining a first probability of emitting one of the label tokens; and
determining a second probability of emitting the blank token, wherein the forward probability comprises the first probability and the second probability;
generating the alignment probability at a sequence level based on the first probability of emitting one of the label tokens and the second probability of emitting the blank token at each output step; and
applying a tuning parameter to the alignment probability at the sequence level to maximize the first probability of emitting one of the label tokens, the tuning parameter applied to the alignment probability independent of any speech-word alignment information.

14. The system of claim 13, wherein the first probability of emitting one of the label tokens at a respective step corresponds to a probability of emitting one of the label tokens after previously emitting a respective label token.

15. The system of claim 13, wherein the second probability of emitting the blank token at a respective step corresponds to a probability of emitting the blank label after emitting one of the blank label or a label token at a step immediately preceding the respective step.

16. The system of claim 13, wherein the first probability and the second probability define a forward variable of a forward-backward propagation algorithm.

17. The system of claim 13, wherein generating the alignment probability at the sequence level comprises aggregating the forward probability and the backward probability for all nodes at each respective step of the alignment lattice.

18. The system of claim 13, wherein applying the tuning parameter to the alignment probability at the sequence level balances a loss at the streaming speech recognition model and a regularization loss when training the streaming speech recognition model.

19. The system of claim 13, wherein emission of the blank token at one of the output steps is not penalized.

20. The system of claim 13, wherein the streaming speech recognition model comprises at least one of:
a recurrent neural-transducer (RNN-T) model;
a Transformer-Transducer model;
a Convolutional Network-Transducer (ConvNet-Transducer) model; or
a Conformer-Transducer model.

21. The system of claim 13, wherein the streaming speech recognition model comprises a recurrent neural-transducer (RNN-T) model.

22. The system of claim 13, wherein the streaming speech recognition model comprises a Conformer-Transducer model.

23. The system of claim 13, wherein after training the streaming speech recognition model, the trained streaming speech recognition model executes on a user device to transcribe speech in a streaming fashion.

24. The system of claim 13, wherein, after training the streaming speech recognition model, the trained streaming speech recognition model executes on a server.

* * * * *